United States Patent [19]
Matsuzaki et al.

[11] Patent Number: 6,092,631
[45] Date of Patent: Jul. 25, 2000

[54] MULTIPOT TYPE DISK BRAKE

[75] Inventors: Yoshiki Matsuzaki; Masahide Hamada, both of Itami; Masayuki Yasuda; Nobuyuki Shimizu, both of Tomakomai, all of Japan

[73] Assignees: Sumitomo Electric Industries, Ltd., Osaka; Nippon Light Metal Company, Ltd., Tokyo, both of Japan

[21] Appl. No.: 09/166,091

[22] Filed: Oct. 5, 1998

[30] Foreign Application Priority Data

Oct. 3, 1997 [JP] Japan ................................ 9-271594

[51] Int. Cl.[7] ........................... F16D 55/228; F16D 65/78
[52] U.S. Cl. ..................... 188/72.5; 188/370; 188/264 F
[58] Field of Search .................. 188/72.4, 72.5, 188/264 R, 264 D, 264 CC, 264 F, 370

[56] References Cited

U.S. PATENT DOCUMENTS

| | | | |
|---|---|---|---|
| 3,261,424 | 7/1966 | Burnett et al. | 188/72.5 |
| 3,331,473 | 7/1967 | Hayes | 188/72.5 |
| 3,424,276 | 1/1969 | Robinette | 188/72.5 |
| 3,882,972 | 5/1975 | Newstead et al. | 188/72.5 |

FOREIGN PATENT DOCUMENTS

| | | |
|---|---|---|
| 5293626 | 11/1993 | Japan . |
| 9177843 | 7/1997 | Japan . |

*Primary Examiner*—Chris Schwartz
*Attorney, Agent, or Firm*—Greenblum & Bernstein, P.L.C.

[57] ABSTRACT

If cylinder bores formed in a caliper parallel to each other are communicated together through a pipe casted in the caliper, the pipe tends to come out of the caliper into a cylinder bore. A separate short pipe is provided to communicate the cylinder bores. The pipe has an engaging portion so as to extend in a diametric direction of the short pipe to prevent longitudinal shift of the short pipe. The engaging portions can be provided easily by forming a recess or a protrusion on the outer periphery of the pipe and casting the pipe in the caliper.

7 Claims, 4 Drawing Sheets

MULTIPOT TYPE DISK BRAKE

BACKGROUND OF THE INVENTION

This invention relates to a multipot type disk brake having a plurality of pistons to press at least one of a pair of opposed friction pads.

Multipot type disk brakes are disclosed e.g. in unexamined Japanese patent publications 5-293626 and 9-177843. Such brakes have a brake fluid supply passage defined by a pipe casted in the caliper.

Such disk brakes have merits that no machining is needed to form the fluid passage, that greater freedom of layout of the fluid passage is obtained (which makes it possible to reduce the resistance to the flow through the passage and thus provide smooth flow of brake fluid), and that it is possible to reduce the wall thickness, weight and size of the caliper by reinforcing the caliper with the pipe.

Multipot type disk brakes include a caliper having a plurality of cylinder bores, and pistons each inserted in the respective cylinder bores for pressing at least one of a pair of opposed friction pads. The other friction pad is pressed i) by an outer claw of the caliper (with floating type disk brake), ii) by a single piston, or iii) by a plurality of pistons (with opposed-piston type disk brakes).

In an arrangement in which the fluid passage in the caliper is defined by a pipe casted in the caliper through which the cylinder bores communicate with each other, if the pipe is provided behind the cylinder bores and brake fluid is supplied to the cylinder bores through holes extending from the pipe to the respective cylinder bores, as disclosed in unexamined Japanese patent publication 5-293626, the thickness from the bottoms of the cylinder bores to the outer surface of the caliper tends to be large, thus unduly increasing the thickness of the caliper. Thus, as an alternative measure, arranging a pipe 3 across the cylinder bores 2 has been proposed.

But in this arrangement, in which the pipe 3 has a short pipe 3a separated from the remaining pipe portion by the cylinder bores 2, the following problems are expected.

If the short pipe 3a is not bonded strongly to the caliper 1 when the former is casted in the latter, or if interfacial peeling occurs between the pipe and the caliper due to a difference in thermal expansion coefficient between the materials of the pipe and the caliper or vibrations during finishing, the pipe 3a may shift longitudinally in the hole 4. In the worst case, the pipe may come out of the hole 4, dropping into the cylinder bore 2 at one or the other side therof.

Even if this happens, brake fluid can be supplied smoothly. But the pipe in the cylinder bore 2 can damage the outer periphery of a piston (5 in FIG. 1), or make it impossible to push back the piston to the original position to replace a friction pad which has worn.

An object of this invention is to prevent shift and dropout of a pipe casted in the caliper in a simple manner.

SUMMARY OF THE INVENTION

According to this invention, there is provided a multipot type disk brake which has an opposed pair of friction pads and a plurality of pistons and at least one of the friction pads is pressed into frictional contact with a disk rotor by the pistons, a caliper formed with cylinder bores parallel to each other, the pistons being mounted in the respective cylinder bores, the cylinder bores communicating with each other through a fluid passage formed in the caliper, and wherein the fluid passage is defined by a pipe casted in the caliper so as to extend between the cylinder bores and communicate the cylinder bores with each other, characterised in that the pipe has a projection or recess in a diametric direction so as to closely engage with the caliper.

In another embodiment of the present invention, the pipe has cutouts so as to be disposed at bottoms of the cylinder bores.

The cutouts of the pipe should be retracted from the inner wall of the cylinder bore.

The engaging portions provided on the pipe can be formed by casting in the caliper a pipe having a projection or a recess on or in the outer periphery of the pipe.

The engaging portions provided on the pipe engage the pipe with the caliper each other, preventing longitudinal shift of the pipe. Thus, even if the pipe shifts slightly due e.g. to weak bonding between the caliper and the pipe, the pipe will not come out or drop out of the hole formed by the pipe.

In the arrangement in which the pipe is provided to extend across the bottoms of the cylinder bores, the bent portions at both sides of the pipe engage the caliper, keeping the pipe in position. Even if the pipe shifts slightly, the pipe will never drop out because the pipe is a one-piece member.

Since the pipe ends are retracted from the inner walls of the cylinder bores, the pipes will not hinder the sliding movement of the pistons.

Other features and objects of the present invention will become apparent from the following description made with reference to the accompanying drawings, in which:

DETAILED DESCRIPTION OF THE PREFERRED EMBODIMENT

Figure 1:
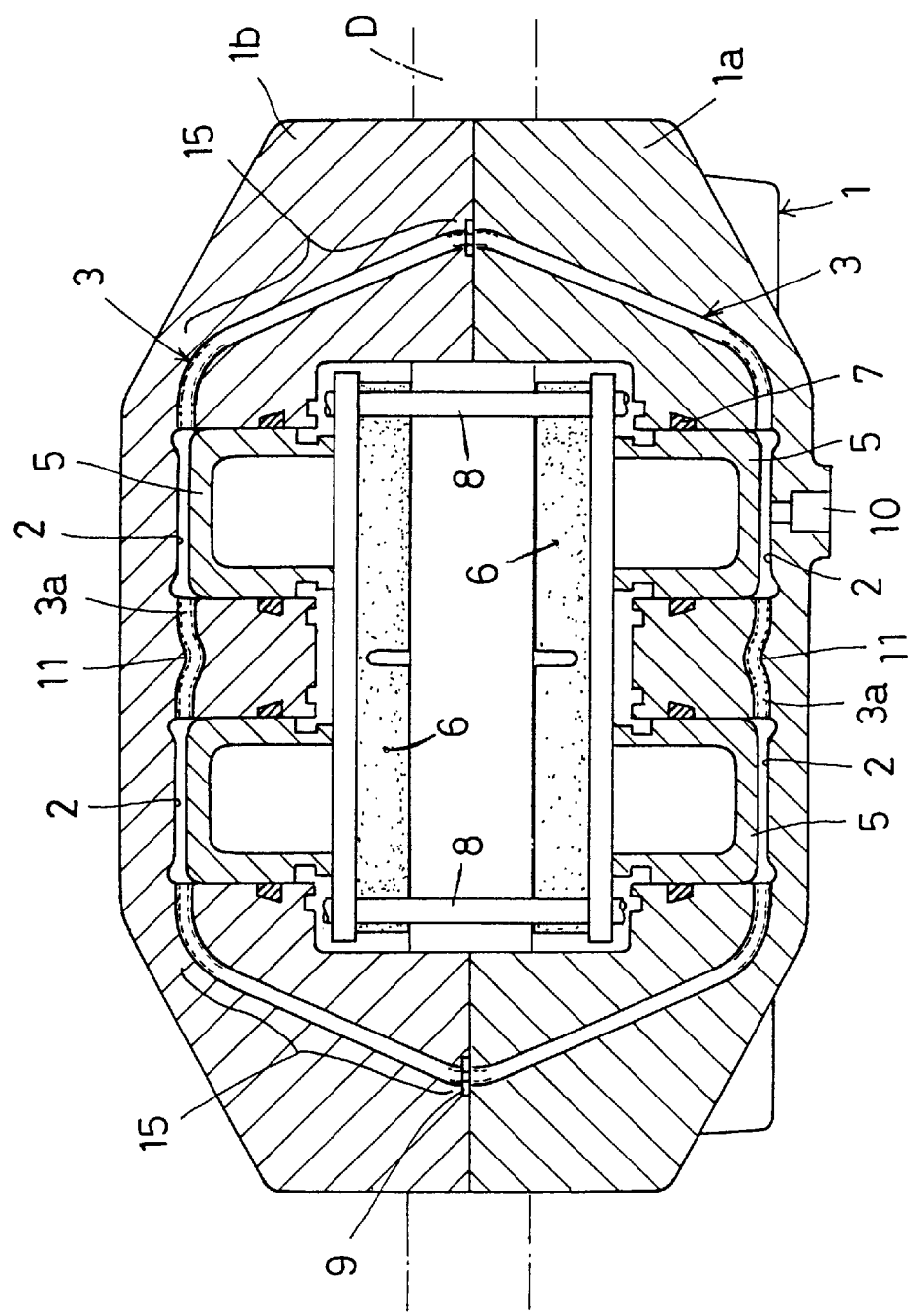
FIG. 1 is a horizontal sectional view of a disk brake embodying this invention.

FIG. 1 shows a disk brake embodying this invention, which is an opposed-piston type disk brake.

This disk brake includes a caliper 1, which comprises inner and outer calipers 1a and 1b separately formed of aluminum alloy or cast iron and coupled together by bolts (not shown).

The inner and outer calipers 1a and 1b are formed with a plurality of (two in the embodiment) cylinder bores 2 arranged parallel to each other. A piston 5 is inserted in each cylinder bore 2 to press a pair of opposed friction pads 6 into frictional contact with both sides of a disk rotor D.

Also shown in the figure are piston seals 7 having the function of retracting the pistons 5, pad pins 8 axially (with respect to the disk) slidably supporting the friction pads 6, fluid seals 9 provided at the connecting portions between a pipe 3 in the inner caliper 1a and a pipe 3 in the outer caliper 1b. The pad pins 8 are supported by the calipers with its both ends inserted through pin holes (not shown) formed in the inner and outer calipers 1a, 1b.

The pipes 3 as a fluid passage are casted in the inner and outer calipers 1a and 1b. In other words, the calipers are casted with the pipes 3 put in position. Through the pipes 3, the cylinder bores 2 communicate with a brake fluid supply port 10.

Each pipe 3 includes an intermediate short pipe 3a separated from the remaining pipe portion. The parallelly arranged cylinder bores 2 communicate with each other through the pipe 3a provided therebetween.

Figure 2:
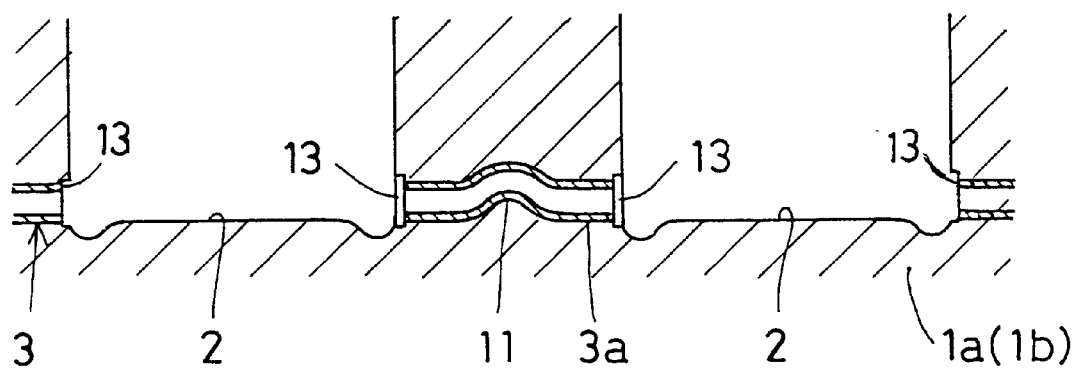
FIG. 2 is a partial enlarged sectional view of the embodiment of FIG. 1.

The pipe 3a has a projection or bend 11 at its intermediate portion as shown on an enlarged scale in FIG. 2. By casting the pipe 3a with the projection 11 in the caliper material, an engaging portion extending in a diametric direction of the pipe is formed between the pipe 3a and the inner caliper 1a (and outer caliper 1b). This portion prevents longitudinal shift of the pipe 3a.

Figure 3:
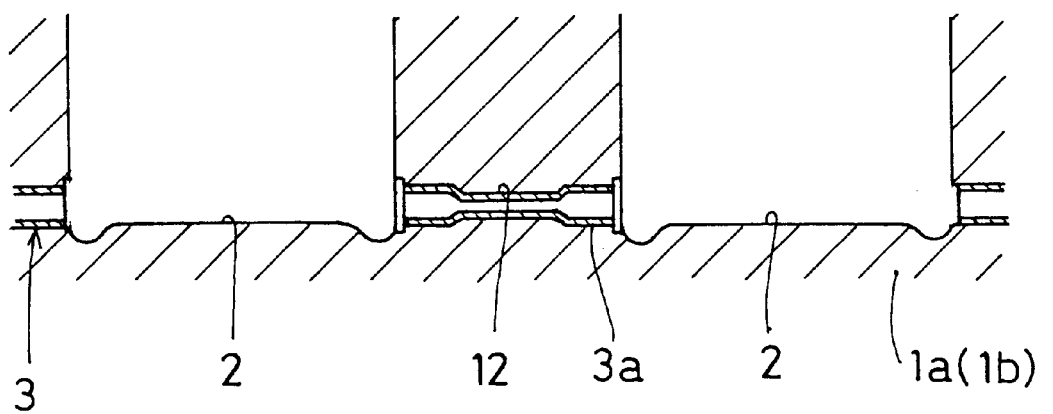
FIG. 3 is a partial sectional view of another embodiment.

FIG. 3 shows another embodiment in which the pipe 3a has a recess 12. In this case, too, an engaging portion extending in a diametric direction of the pipe 3 is formed on the pipe 3a. These portions prevent longitudinal shift of the pipe 3a. The recess 12 shown in FIG. 3 is formed by drawing the pipe 3a at its mid-portion. But such a recess or a projection may be formed in any other manner.

In the arrangement of FIG. 2 or FIG. 3, it is preferable to cut the ends of the pipe 3a and the pipe 3 and form a recess 13 in the cylinder bores 2 around the pipe ends when finishing the cylinder bores 2 so that the pipe ends are slightly retracted from the inner walls of the cylinder bores 2. With this arrangement, even if the pipe 3 and the pipe 3a should shift slightly, the pipe ends will not protrude into the cylinder bores 2. This prevents interference of the pipe 3 or the pipe 3a with the pistons 5 shown in FIG. 1.

Figure 4:
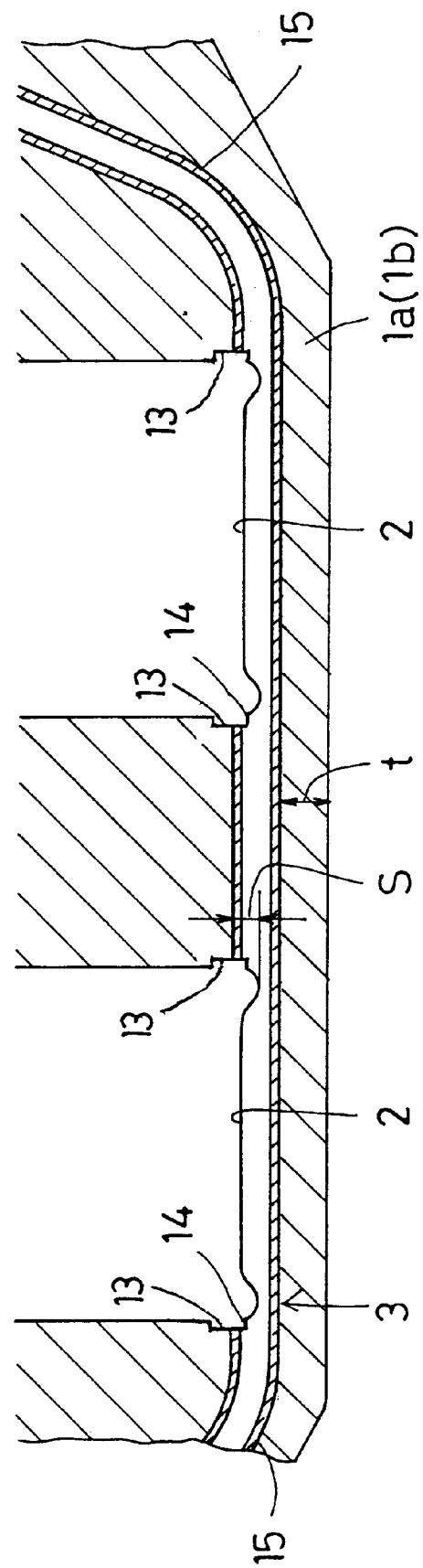
FIG. 4 is a partial sectional view of a still another embodiment.
Figure 5:
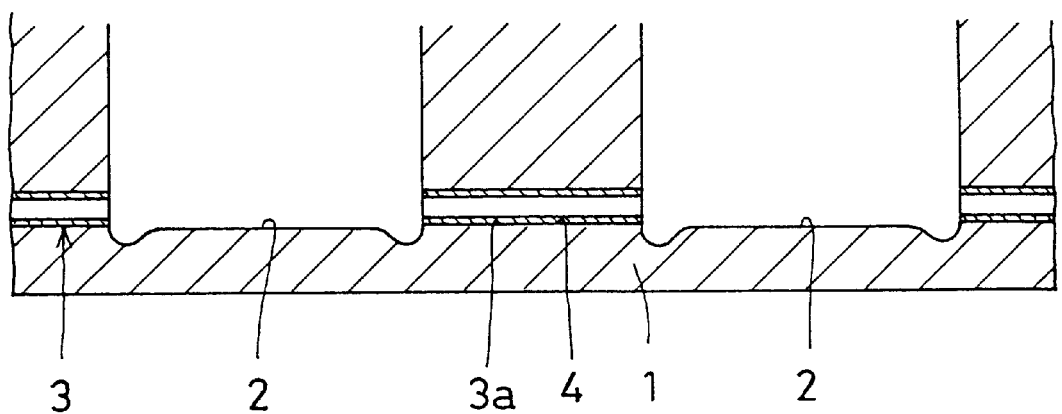
FIG. 5 is a similar view of a prior art disk brake.

FIG. 4 shows another embodiment of a disk brake in which a pipe 3 extends across the bottoms of the cylinder bores 2.

The pipe 3 has bent portions 15 at both ends, and a middle straight portion formed with cutouts 14 which are in the cylinder bore 2 at their bottom. The passage in the pipe 3 thus communicates with the cylinder bores 2 through the holes defined by the cutouts 14. In this embodiment, the bent portions 15 (refer also to FIG. 1) engage the inner caliper 1a (and outer caliper 1b), thus keeping the pipe 3 in position. Since the pipe 3 partially penetrates into the cylinder bores 2 so as to extend across the cylinder bores 2, it is possible to reduce the thickness t of the caliper bottom by the length a by which the pipe 3 penetrates into the cylinder bores 2, compared with conventional brakes of this type.

Further, the cutouts 14 of the pipe 3 are retracted from the inner walls of the cylinder bores 2 by forming recesses 13 to prevent the edges of the cutouts 14 from protruding into the cylinder bores 2 and interfering with the sliding pistons.

It will be enough if the edges of the cutouts 14 are retracted only slightly. The edges of the cutouts may be retracted not by recessing but by any other method such as partial machining.

In any of the embodiments, two cylinder bores 2 are formed in each of the inner and outer calipers 1a, 1b. But this invention is also equally applicable to opposed-piston type disk brakes having more than two cylinder bores in each of the inner and outer calipers, opposed-piston type disk brakes having one cylinder bore in one of the inner and outer calipers, and floating type disk brakes in which a plurality of cylinder bores are formed in only the inner caliper.

The pipe arrangement of the present invention is also applicable to a fluid passage in a fluid pressure system of an antilock brake system. In fact, the present invention is applicable to any cast hydraulic unit having fluid passages in the form of straight or arcuate pipes that tend to shift axially due to poor bonding or due to the pipes not being bonded on purpose. That is, by providing engaging portions extending in a diametric direction of the pipes, it is possible to easily and reliably prevent axial shift or dropout of the pipes.

What is claimed is:

1. A multipot disk brake which has an opposed pair of friction pads and a plurality of pistons and at least one of said friction pads is pressed into frictional contact with a disk rotor by said pistons, a caliper formed with cylinder bores parallel to each other, said pistons being mounted in said respective cylinder bores, said cylinder bores communicating with each other through a fluid passage formed in said caliper, and wherein said fluid passage is defined by a pipe cast in said caliper to extend between said cylinder bores and communicate said cylinder bores with each other, said pipe having one of a projection and a recess in a diametric direction so as to operatively engage said caliper.

2. A multipot disk brake which has an opposed pair of friction pads and a plurality of pistons and at least one of said friction pads is pressed into frictional contact with a disk rotor by said pistons, a caliper formed with cylinder bores parallel to each other, said pistons being mounted in said respective cylinder bores, said cylinder bores communicating with each other through a fluid passage formed in said caliper, and wherein said fluid passage is defined by a pipe cast in said caliper so as to extend between said cylinder bores, said pipe being a single integral pipe extending across bottom surfaces of said respective cylinder bores, a plane that includes said bottom surfaces passing through an interior space of said pipe, said pipe being cut out at least at a portion of said pipe disposed inside a said cylinder bore.

3. A disk brake having an opposed pair of friction pads and a piston, at least one of said friction pads being pressed into frictional contact with a disk rotor by said piston, wherein a fluid passage formed in a cylinder bore formed in a caliper is defined by a pipe cast in said caliper and said piston is mounted in said cylinder bore, said pipe being cut out at least at a portion of said pipe disposed inside a said cylinder bore, said cut out portion having opposed ends, wherein recesses are formed in a side wall of said cylinder bore at both said ends of said cut out portion.

4. A cast hydraulic part having a cast member and a fluid passage defined by one of a straight and an arcuate pipe cast in said cast member, said pipe having an engaging portion extending in a diametric direction of said pipe so as to operatively engage said cast member.

5. The multipot disk brake according to claim 2, wherein said cut out portion has opposed ends, and wherein recesses are formed in a side wall of said cylinder bore at both said opposed ends of said cut out portion.

6. A multipot disk brake comprising:

a plurality of pistons;

an opposed pair of friction pads, at least one friction pad of said opposed pair of friction pads adapted to be pressed into frictional contact with a disk rotor by said plurality of pistons;

a caliper formed with cylinder bores parallel to each other, each of said plurality of pistons being mounted in a respective said cylinder bore, said cylinder bores communicating with each other through a fluid passage formed in said caliper, said fluid passage comprising a pipe cast in said caliper extending between said cylinder bores and communicating said cylinder bores with each other, said pipe having one of a projection and a recess in a diametric direction of said pipe so as to operatively engage said caliper, said one of a projection and a recess configured to prevent sliding of said pipe within said caliper.

7. A cast hydraulic part comprising:

a cast member; and a fluid passage comprising one of a straight and an arcuate pipe cast in said cast member; wherein said pipe has an engaging portion extending in a diametric direction of said pipe so as to operatively engage said cast member, said engaging portion configured to prevent sliding of said pipe within said cast member.

* * * * *